United States Patent

[11] 3,571,510

[72] Inventor Richard Dean Weir
San Jose, Calif.
[21] Appl. No. 787,421
[22] Filed Dec. 27, 1968
[45] Patented Mar. 16, 1971
[73] Assignee International Business Machines Corporation
Armonk, N.Y.

[54] COORDINATED DATA DETERMINATION SYSTEM
10 Claims, 3 Drawing Figs.

[52] U.S. Cl. .......... 178/18, 340/347
[51] Int. Cl. .......... G08c 21/00
[50] Field of Search .......... 178/18, 19, 20; 340/324.1, 347 (A/D); 324/72; 315/18; 343/7.3

[56] References Cited
UNITED STATES PATENTS

| | | | |
|---|---|---|---|
| 3,497,617 | 2/1970 | Ellis | 178/19 |
| 3,466,646 | 9/1969 | Lewin | 340/347 |
| 3,461,454 | 8/1969 | Steckenrider | 343/112 |
| 3,440,643 | 4/1969 | Teager | 340/347 |
| 3,342,935 | 9/1967 | Leifer | 178/19 |
| 3,156,766 | 11/1964 | Stamps | 178/18 |
| 3,134,099 | 5/1964 | Woo | 340/347 |

*Primary Examiner*—Kathleen H. Claffy
*Assistant Examiner*—Tom D'Amico
*Attorneys*—Hanifin & Jancin and George E. Roush

ABSTRACT: The use of graphical display devices in conjunction with digital computer and data processing systems is enhanced by a rectangular, or XY, coordinate determinate system providing a completely unobstructed view of the display by means of electromagnetic fields propagated in the plane of the display. A pair of wire radiating elements are arranged parallel to each other at opposite edges of the display for radiating opposing electromagnetic fields therebetween at a frequency of the order of 25 kilohertz (kHz.) for each ordinate direction (X or Y). An electromagnetic field probe tuned to the frequency of the radiation derives analogue voltages proportional to the distances of the probe with respect to the null at the center of the display. The analogue voltages are converted to digital representation by means of analogue-to-digital converters (ADC). The conversion circuitry comprises a ramp voltage generator having a characteristic compensating for the nonlinear characteristic of the electromagnetic fields which controls an X and Y counter advanced by pulses derived from the 25 kHz. oscillator under control of circuitry comprising conventional gating circuits and latches. Cartesian coordinates are derived from the X and Y coordinate data thus far developed by means of a quadrant detector which is switched by the control circuitry in response to energy picked up by the probe in the particular quadrant at which it is positioned for the desired data input.

Patented March 16, 1971 3,571,510

2 Sheets-Sheet 1

*INVENTOR*
RICHARD D. WEIR

*BY* George [signature]

ATTORNEY

Patented March 16, 1971 3,571,510

2 Sheets-Sheet 2

COORDINATED DATA DETERMINATION SYSTEM

The invention involves the same general field of the graphical display coordinate data determining art as that disclosed in the copending U.S. Pat. application Ser. No. 735,019 of Robert A Johnson and Ray N. Steckenrider and Ser. No. 735,018 of Ray. N. Steckenrider, both filed on Jun. 6, 1968 and the latter thereafter issued on Aug. 12, 1969 a U.S. Pat. No. 3,461,454 for "Position Identifying Device," both assigned to the International Business Machines Corp. Reference to these U.S. Pat. applications will be helpful in understanding the background of this invention.

The invention relates to graphic displays used in conjunction with electronic computing and a data processing systems, and it particularly pertains to the determination of Cartesian coordinates of random loci of points within a predetermined planar area for use with digital systems; however, it is not limited to such systems.

In the contemporary information handling art, attention is being directed to the use of graphic displays for exhibiting a large quantity of information in readily assimilated form for use in teaching and learning, engineering and technical designing, vehicular traffic detecting and controlling, and weather forecasting, for example. The development of this art has reached a level at which it is particularly desirable that data from such a display be reduced readily and reintroduced into an electronic information handling system, particularly a digital computing and/or data processing system. Such arrangements are described in the above-referenced copending U.S. Pat. application Ser. Nos. 735,018 and 735,019. Prior art approaches to this problem applied the principle of resistance and conductive grids and plates similar to those used in early telautograph systems. The grids were made either of fine wire or some transparent material which had sufficient conductivity for the purpose. The plates, in most cases, were coatings of transparent but conductive material. It has also been suggested that a map or similar display be placed on an opaque metallic plate having means for establishing an electric current gradient thereacross. Transparent dielectric waveguide structures have been suggested having little discontinuity between the separate waveguides so as to be as little objectionable as possible. All of these arrangements suffer from the principal disadvantage that the optical viewing path is deterred to at least some extent. Nondeterring schemes involve "Optical" grids formed by light beams, both in the visible and invisible spectrum, but these schemes are readily disturbed by the interposition of the fingers and like nonprobing elements. Other systems are know for use with cathode-ray tube displays wherein a light-sensitive probe is placed on the screen of the cathode-ray tube and a measure of the loci obtained by measuring the time between the beginning of the cathode-ray tube scan and the time it passes the probe. All of these systems mentioned are relatively expensive and most of them are complex except for the CRT-light probe arrangement which, however, is limited to the cathode-ray tube display only and therefore something less than desirable. Examples of this prior art are to be found in the following U.S. Pats.:

2,241,544 5/1941 Dreyer 178–616
2,527,835 10/1950 Miller 178–19 2,925,467 2/1960 Becker 178–18 3,106,707 10/1963 Thompson 343–713
3,134,099 5/1964 Woo 340–347
3,170,987 2/1965 O'Brien 178–18
3,316,486 4/1967 Woods 324–34 and an article from the technical literature: W. E. Triest, IBM Technical Disclosure Bulletin, "Light Pen Tracking System," Jan. 1965, pp. 692–692.

According to the invention, the objects indirectly referred to hereinbefore and those which will appear as the disclosure progresses are attained in an ordinate determination system comprising a pair of elongated electromagnetic energy radiating elements spaced apart and parallel with respect to one another on opposite sides of the display. Alternating current of given frequency from a suitable generator is applied for radiating electromagnetic energy from the elements, at least in the area therebetween, effecting a null substantially midway between the elements. A probe tuned to the given frequency is inserted in the field to detect the difference in electromagnetic energy radiated from the radiating elements at any point intermediate thereof, and circuitry couple to the probe is arranged for converting the difference in electromagnetic energy detected to an indication of the ordinants of the location of the point with respect to the radiating elements. Known analogue-to-digital converting circuits, of course, may be used for reducing the analogue data to digital data is know fashion. According to the invention, a ramp voltage generator is arranged to deliver a ramp voltage of characteristics compensating for the characteristic of the variation in the difference in electromagnetic energy detected at differing distances from the radiating elements at any point between the elements. Fundamentally, the radiation follows a "square law," but in practice it involves some variation therefrom. The two voltages are applied to a comparing circuit which is part of the overall circuit controlling a digital counter to which incrementing pulses derived from the generator of alternating current are applied. Logical circuitry, mainly comprising AND and OR gating circuits and latches, is arranged to determine the side of the null on which the probe is located and convert the digital data in accordance therewith. Further control circuit is arranged to operate two ordinate determination systems alternately to provide the coordinates of the display area for transmittal to electronic computing and/or data processing circuitry in accordance with a request for such data therefrom.

In order that the advantages of the invention may be readily attained in practice, a description of a preferred embodiment of the invention is given hereafter, by way of example only with reference to the accompanying drawing, forming a part of the specification and in which.

Figure 1:
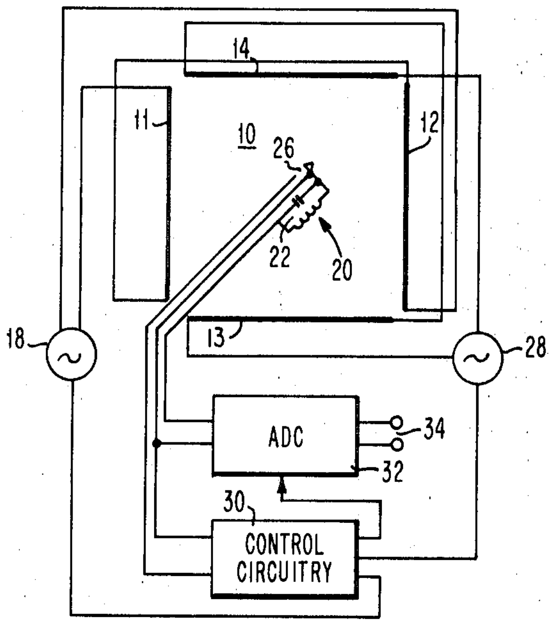
FIG. 1 is a functional diagram of circuitry according to the invention.

The essential elements of the coordinate data determination system according to the invention are depicted in the schematic diagram of FIG. 1. A graphic display (Not shown) bearing the information with reference to which the Cartesian coordinates are desired, for example, the coordinates of a point on a map, is placed in a display area 10, the extreme limits of which are defined by linear elements 11, 12, 13 and 14. The latter elements, according to the invention, are elongated electromagnetic radiating elements as will be more fully described hereinafter. The vertically extending radiating elements 11 and 12 are energized by an alternating current generator 18 of conventional form for the radiation of electromagnetic energy in the horizontal direction between the elements 11 and 12 in such opposing phase relationship that a null is provided substantially midway between the radiating elements 11 and 12 substantially along a line parallel thereto. An analogue value of electric current measuring the location of a point within the area 10 with respect to the null line is obtained by means of an electromagnetic energy probe 20 having a circuit 22 tuned to the frequency of the generator 18 for detecting the difference in the electromagnetic energy radiated from the radiating elements 11 and 12. Maximum pickup is obtained with an inductor having direct inductance and interwinding capacitance of values resonating at or near the frequency of the magnetic field. Preferably, the probe 20 also incorporates a switch 26 arranged to render this determination effective only when the probe is pressed against the display in the area 10 at the point at which a determination is desired. Similarly, an analogue value of an ordinate in the vertical direction away from a horizontal null line is obtained by measuring the difference in electromagnetic energy radiated between the horizontally extending radiators 13 and 14 which are energized by another generator 28. The generator 28 may be tuned to the same frequency as the generator 18, or a single generator may be time-shared in such a case. The generator 28 may be tuned to a different frequency in which case the circuit 22 of the probe 20 must be of more complex form in order to respond to two different frequencies. Another alternative solution is for the generator 28 to generate a harmonic of the frequency of the generator 18, however, the reliable distinction between harmonics is frequently more difficult and more expensive in embodiment than other methods of distinguishing the energy between the horizontal and vertical radiating elements. As thus far described, two analogue values of energy are detected representing a point within one of four possible quadrants of the display area 10. The particular quadrant is resolved by control circuitry 30 of which a logical example of embodiment will be described hereinafter. The control circuitry 30 also is arranged, if desired, to convert the analogue representations referred to the center of the display area 10 to coordinates based on a reference point at the corner of the display area, which conventionally is the lower left corner. Because radiation from the elongated elements 11—14 fundamentally varies as the square of the distance from the radiating element and reflects the influence of other elements so that a true square law of response is not obtained, the analogue value is linearized to the extent desired, for example, by utilizing ramp voltage generators preferably having waveform characteristics compensatory of the nonlinear waveform characteristics of the energy detected by the probe 20. Preferably, the analogue values are reduced to digital values by means of an analogue-to-digital converter 32 from which the digital values are presented at terminals 34 for transmission to an electronic computing and/or data processing system.

Figure 2:
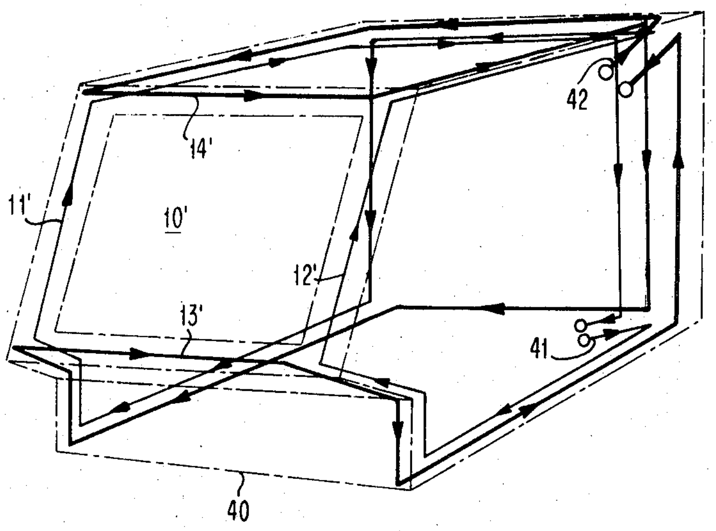
FIG. 2 is an isometric schematic view of the radiating elements according to the invention.

Radiating elements 11—14 need only be a length of fine wire through which currents of the desired frequency are passed. Therefore, these lengths of wire may be held in a convenient frame arranged about the information to be displayed, such as a map, photograph, drawing and the like. It is a definite advantage of the invention that such a substantially two-dimensional structure can be provided. The invention has been embodied in combination with conventional display devices such as cathode-ray tubes, filmstrip projectors, and the like, which require three dimensional cabinets. An example of such a cabinet is shown in phantom by the chain line 40 in the isometric diagram of FIG. 2. The effective display area is bounded by the edges of an aperture 10′ in the cabinet and the horizontal electromagnetic energy radiating elements 11′ and 12′ are portions of a long wire 41 laid in the corners of the cabinet surrounding the display apparatus (not shown) suitably mounted in the interior of the cabinet. In the interest of clarity, the terms "horizontal" and "vertical" hereinafter will be confined to the direction of radiation and of the ordinate determined, which direction is, of course, perpendicular and therefore opposite to the direction in which the corresponding radiating elements actually extend. The terminals of the wires 41 and 42 are preferably at the rear of the cabinet for convenient connection to the electronic circuitry elements conventionally mounted thereat. The walls of the cabinet are preferably made of metal of characteristic suitable for shielding and confining radiation from the wires 41 and 42 except in the substantially planar area of the aperture 10′ wherein radiating elements 11′—14′ are fully effective in the area in which the probe is to be inserted. In practice, conventional cabinets have been utilized for the outer cover and shielding structure indicated by the chain line 40 without any change required by the system according to the invention.

Figure 3:
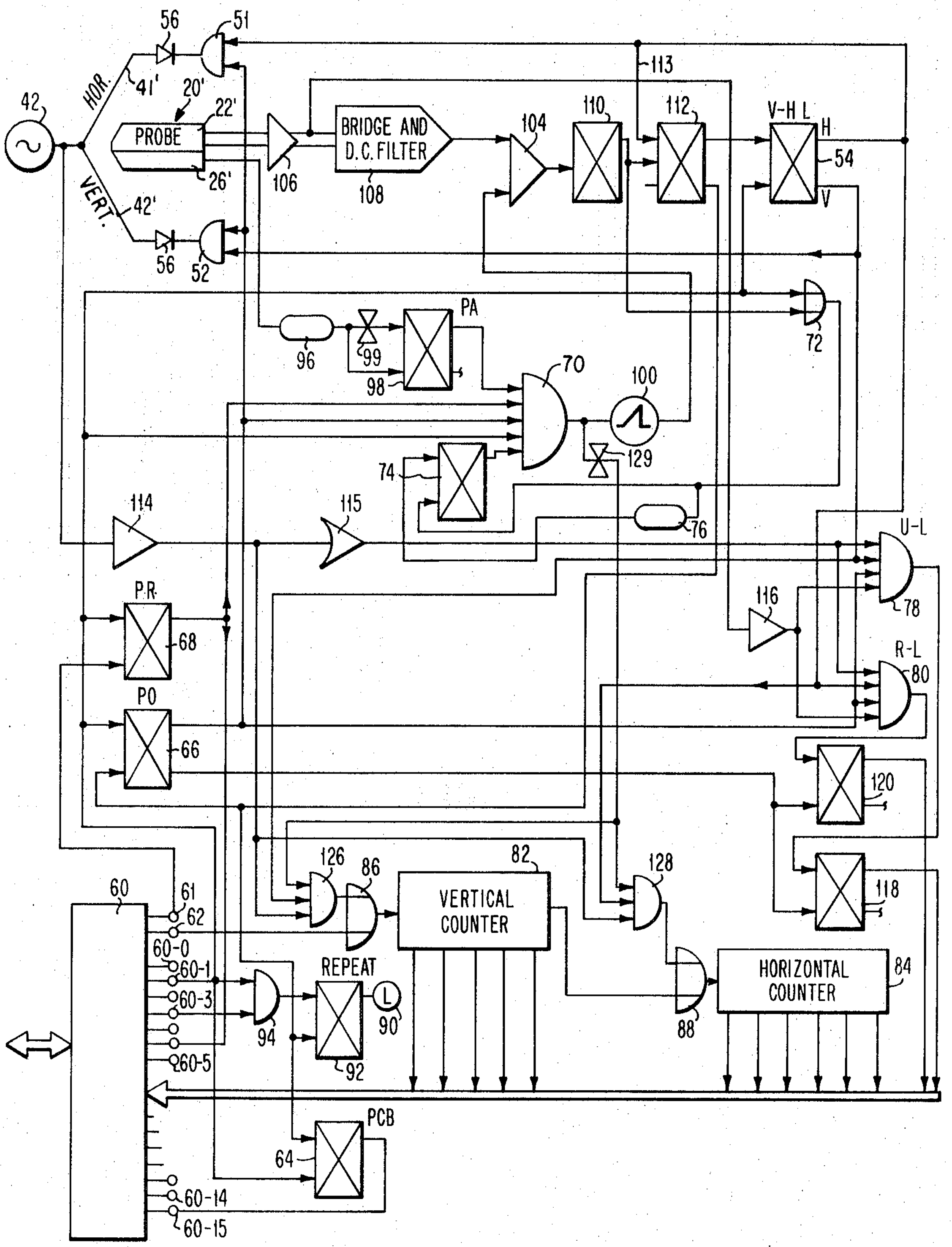
FIG. 3 is a logical circuit diagram of an exemplary embodiment of the invention.

FIG. 3 is a logical diagram of an exemplary embodiment according to the invention. In this embodiment, a single alternating current generator 42 operating at a frequency of the order of 25 kHz. is used to energize the horizontal radiating elements in the wire 41′ alternately with the vertical radiating elements in the wire other wire 42′ and to supply pulses to portions of the circuitry forming the analogue-to-digital converter as will be described more completely hereinafter A pair of AND gating circuits 51 and 52 responsive to a horizontal-vertical latch (V-HL) 54 are effective to return the wires 41′ and 42′ back to the generator 42.

The interface to a computing system is represented more by an interfacing unit 60 having two control line terminals 61, 62 and 16-character bit line terminals 60-0 through 60-15. This rudimentary representation, together with the description to follows, will be sufficient for those skilled in the art to adapt the invention to the desired applications. This interfacing unit 60 conventionally is the interfacing unit of the display device itself.

Initially, a predetermined (10 microsecond) pulse level at interfacing unit 60 terminal 60-1 is transmitted by the associated system for readying the coordinate data determination system. This level resets a probe call bit latch 64, sets a probe operate latch 66, and a probe response latch 68, applies a level to a ramp control gate 70, resets the vertical-horizontal latch 54 and, by the way of an OR gating circuit 72 resets a ramp ready latch 74 and afterward, by way of a ramp time delay (of 2—20 microseconds) circuit 76, sets the ramp ready latch 74. The probe operate latch 66 is now effective to enable the radiating element and gating circuits 51 and 52, apply an enabling level to the ramp control and gating circuit 70 and to the quadrant determining AND gating circuits 78 and 80. The probe response latch 68 is effective to apply a level to the ramp control AND gating circuit 70 and, at the same time, applies that level to the terminal 60-5 of the interfacing unit 60 to indicate that the coordinate data determination system is in condition for generating a response and subsequently will deliver data in parallel over a bus connected to all of the terminals 60-5 through 60-15 in the form of digital binary codes levels from a vertical counter 82 and a horizontal counter 84. It is a feature of the circuit shown that a 16-bit shift register of the associated display device is converted to a dual capacity component by the interposition of OR gating circuits 86 and 88 whereby digital data for other purposes appearing at the terminal 62 of the interfacing unit 60 are rippled into the register comprising the vertical counter 82 and the horizontal counter 84.

In some applications, a repeat operation may be necessary. The necessity is indicated by the lighting of a lamp 90 under the control of a repeat latch 92. The repeat latch 92 is set by the output of a repeat AND gating circuit 94 to which a level is applied from the terminal 60-3 simultaneously with one from the terminal 60-1. The latter level will be effective to initialize the system as described immediately above.

The vertical radiating element wire 42 is now energized in readiness for determination of the vertical or Y ordinate. The probe 20′ is inserted into the electromagnetic field radiated by the elements and pressed against the display until the mechanically operated switch 26′ is closed to indicate that the probe is positioned. The closure of the switch 26′ is delayed in effect by a delay circuit 96 of approximately2—20 microseconds delay. This delay is provided in the event that the probe is pressed against the display when the initializing operation is in process in order to give the system time to establish normal radiation. The switch 26′ triggers a probe active latch which is effective to close the ramp control AND gating circuitry 70 for turning on a ramp voltage generator 100. The output of the ramp voltage generator 100 is applied to one terminal of a comparator circuit in the form of a differential amplifier 104. The tuned circuit 22′ of the probe 20′ derives a small analogue voltage proportional to the field strength at the location of the point for which the X and Y coordinates are to be determined. This low voltage is applied to a differential band-pass amplifier 106 of substantial gain. The amplified AC voltage is converted to a direct voltage by means of a full wave bridge rectifier and DC filter circuit 108. This direct voltage is an analogue measure of the horizontal distance of the probe 20′ from the vertical null line without regard to which side of the null line the probe is located. The relationship between the value of the voltage and the distance away from the null line of the probe desirably is linear, however, in practice, it is far from linear. Preferably, the characteristics of the direct voltage at the output of the rectifier and filter 108 are compensated for by a complimentary nonlinearity of the voltage delivered by the ramp voltage generator 100.

In this manner, a predetermined output voltage is derived from the comparator circuit 104. In the particular circuit arrangement shown, the output of the comparator 104 is applied to a match detector in the form of a Schmitt trigger 110 which provides a highly desirable "toggle" action at the point where the two voltages are matched. A probe cycle advancing circuit 112 is coupled to the match detector trigger 110 and responsive to the leading edge of the resultant output voltage thereof for setting the vertical-horizontal latch (V-HL) 54. The probe cycle advancing circuit 112 is assembled from conventional electronic logic circuit components. It is arranged to be triggered in binary fashion by the DC output pulse from the match detector 110 to deliver a DC pulse at the output terminal for setting the V-H latch 54 each time the match detector level is raised and the V-H latch 54 is in the horizontal active condition. It is also arranged to deliver a DC pulse at the other output terminal of the probe cycle advancing circuit every time the match detector 110 triggers it and the V-H latch 54 is in the horizontal active condition. This is accomplished under the control of the V-H latch 54 inhibiting the circuit 112 over the line 113 when the V-H latch 54 is set. The setting of the V-H latch 54 also resets the ramp generator ready latch 74 and in effect resets the ramp generator 100 to the initial state. The output of the match detector 110 lasts just long enough to thereafter set the ramp generator ready latch through the OR gating circuit 72 after a 20 microsecond delay in the delay line 76. The second half of the probe cycle now commences to determined the horizontal ordinates.

A saturation-type squaring amplifier 114 produces substantially square waves at the fundamental frequency of the generator 48. These square waves are differentiated in a conventional differentiating circuit 115 for application to the quadrant determining AND gating circuit 78 and 80 for enabling these gating circuits at appropriate short intervals.

The output of one phase of the band-pass amplifier 106 is applied to a saturating amplifier 116, the output of which is applied to the quadrant determining AND gating circuit 78 and 80. The output of the phase determining saturating amplifier 116 is substantially zero if the probe is placed on one side of the horizontal null line and substantially unitary if the probe is on the other side of the null line. In this manner, an upper-lower sector latch 118 and a right-left sector latch 120 are sufficient to indicate one of the four quadrants at which the probe 20′ is placed. The binary digit information from the latches 118 and 120 are entered into the associated system at terminal 60-5 of the interfacing unit 60. The square wave pulses from the squaring amplifier 114 are applied to a vertical counter AND gating 126 for subsequent application through the vertical counter OR gating circuit 86 to the vertical counter 82. The vertical counter AND gating circuit 126 is also enabled during the vertical ordinate probing time by the output level at the vertical p output of the V-H latch 54. The vertical and horizontal AND gating circuits 126 and 128 are also enabled at the beginning of the ramp voltage cycle by the closing of the ramp control AND gating circuits 70 delivering its output to an inverter circuit 129 to and AND gating circuits 126 and 128. The latter AND gating circuits 126 and 128 are opened at the end of the desired count by the operation of the V-H latch 54.

Similarly, the X coordinate of the probe location is derived and the count is gated through the AND gating circuit 128 to the horizontal counter 84. At the end of X-coordinate portion of the probe cycle, the probe cycle advancing circuit 112 delivers a pulse to set the probe call bit latch indicating that the X and Y coordinates are waiting to be read out of the counters 82 and 84 and resets the probe operate latch 66, the repeat latch 92 to prevent more than one X-Y determination at a time except for a possible repeat request.

The numbers in the counters 82 and 84 are read out in parallel on the bus leading to the terminals 60-5 through 60-15 by means (not shown) in the associated system which are entirely conventional. For example, when a response command signal appears at the response terminal 61 of the interface unit 60. Conversion of these numbers to Cartesian coordinates, or polar coordinates, if so desired, is accomplished by conventional conversion circuitry for that purpose in the associated information handling system.

While the invention has been described in terms of a preferred embodiment, it should be clearly understood that those skilled in the art will make changes in form and material without departing from the spirit and scope of the invention

I claim:

1. A coordinate determination system, comprising:
four elongated electromagnetic energy radiating elements arranged along the sides of a rectangle,
a generator of alternating current electric energy of given frequency.
switching elements for coupling said generator alternately to pairs of said radiating elements on opposite sides of said rectangle for radiating electromagnetic energy therebetween,
a probe tuned to said given frequency for detecting the difference in magnitude of the electromagnetic energy radiated from said radiating elements at any point within said rectangle,
a ramp voltage generating circuit, having an output terminal,
a voltage comparator having one input coupled to said probe, another input coupled to said ramp generating circuit and an output terminal, and
a ramp voltage generating control gating circuit coupled between the output terminal of said comparator and said ramp voltage generating circuit for providing an indication that the ramp voltage is proportional to said difference in electromagnetic energy relating to the locus of a selected point within said rectangle.

2. A coordinate determination system as defined in claim 1 and incorporating
control circuitry connected between said comparator and said switching elements for alternating said coupling of said generator to said pairs of radiating elements in accordance with the output of said comparator.

3. A coordinate determination system as defined in claim 2 and wherein
said control circuitry is coupled to said ramp voltage generating gating circuit for resetting said ramp voltage generating circuit in accordance with the output of said comparator.

4. A coordinate determination system as defined in claim 1 and incorporating:
a counting circuit,
a gating circuit coupled to said counting circuit for admitting pulses thereto and having one input coupled to said generator for accepting pulses therefrom, a terminal coupled to said comparator and another terminal coupled to said ramp voltage generating circuit for controlling the admission of said pulses
whereby the number in said counting circuit is proportional to said difference in electromagnetic energy.

5. A coordinate determination system as defined in claim 2 and incorporating:
electric voltage translating circuit interposed between said probe and said comparator and having an output terminal indicative of the phase difference of said electromagnetic energy as well as the difference in magnitude, and
quadrant detecting circuitry coupled to said switching elements and to said output terminal of said electric voltage translating circuit for indicating the quadrant of the point at which said probe is arranged.

6. A coordinate determination system as defined in claim 5 and wherein:
said electric voltage translating circuit is a band-pass amplifier, and
said comparator is a unity gain differential amplifier.

7. A coordinate determination system as defined in claim 4 and incorporating:
two counting circuits, a gating circuit coupled to each of said counting circuits for admitting pulses thereto and having one input coupled to said generator for accepting pulses therefrom, a terminal coupled to said comparator and another terminal couple to said ramp voltage generating circuit for controlling the admission of said pulses, whereby the numbers in said counting circuits are proportional to differences in electromagnetic energy at a given point within said rectangle.

8. An ordinate determination system comprising:

two elongated radiating elements spaced apart and parallel with respect to one another, a generator of alternating current of given frequency couple to said radiating elements for radiating electromagnetic energy therefrom at least in the area between said radiating elements, said radiating elements being connected in series with the current supplied by said generator effecting opposing electromagnetic fields between said elements whereby a null is present substantially midway between said radiating elements, a probe tuned to said given frequency for detecting the difference in electromagnetic energy radiated from said radiating elements at any point intermediate said radiating elements, and circuitry coupled to said probe for converting said difference in electromagnetic energy detected and the relative location of said null to an indication of the ordinate of the location of said point with respect to said radiating elements.

9. An ordinate determination system comprising:

an elongated electric conductor arranged with two sections parallel to each other defining a plane and extending in directions affording instantaneous opposing electromagnetic radiating fields between said sections upon excitation of said conductor at the terminals thereof, means for applying alternating current electromagnetic energy of given frequency at said terminals of said conductor for radiating electromagnetic energy from said sections at least in said plane, means preventing radiation of such energy from other portions of said conductor from interfering with radiation in said plane and said plane being free of conductive material, a probe electrically isolated from said conductor and electromagnetically tuned to said given frequency for detecting the difference in electromagnetic energy radiated from said two sections of said conductor at any point in said plane defined thereby, and circuitry coupled to said probe for converting said difference in electromagnetic energy detected to an indication of the ordinate of the location of said point with respect to said two sections of said conductor.

10. A coordinate determination system comprising:

one elongated electric conductor arranged with the radiating sections spaced apart and parallel to each other defining a plane and extending in directions affording instantaneous opposing electromagnetic fields between said sections upon excitation of said conductor at the terminals thereof, another elongated electric conductor with two radiating sections parallel spaced apart and parallel to each other lying substantially in said plane and between the two sections of said one conductor therewith defining a rectangle and extending in directions affording instantaneous opposing electromagnetic fields between the sections upon excitation of said other conductor at the terminals thereof, a generator of alternating current electric energy of given frequency, means coupling said generator alternately to said conductors at said terminal thereof for radiating electromagnetic energy between said radiating sections on opposite sides of said rectangle, means preventing radiation of such energy from portions of said conductors other than said radiating sections from interfering with radiation within said rectangle and said plane within said rectangle being free of conductive material, a probe tuned to said given frequency for detecting the difference in electromagnetic energy radiated from said radiating sections at point within said rectangle, and circuitry for converting said difference in electromagnetic energy to coordinate indications of the locus of said point within said rectangle.